United States Patent [19]
Walters

[11] 3,797,890
[45] Mar. 19, 1974

[54] PNEUMATIC SCALING SYSTEM

[76] Inventor: Armon J. Walters, 39 Haverhill Rd., Trumbull, Conn. 06611

[22] Filed: Oct. 16, 1972

[21] Appl. No.: 297,931

[52] U.S. Cl............ 302/3, 141/83, 141/128, 302/22, 302/27, 302/28, 302/42, 302/49
[51] Int. Cl............ B65g 53/40, B65g 53/66
[58] Field of Search............ 141/83, 128; 171/121–123, 81; 302/3, 22, 27, 28, 42, 49

[56] References Cited
UNITED STATES PATENTS

| | | | |
|---|---|---|---|
| 1,541,903 | 6/1925 | Crites | 302/42 X |
| 3,158,405 | 11/1964 | Krenke | 302/3 |
| 2,688,517 | 9/1954 | Riordan | 302/28 |
| 3,311,418 | 3/1967 | Scruby et al. | 302/3 |
| 1,941,190 | 12/1933 | Schneider | 302/28 |
| 1,468,966 | 9/1923 | Herington | 302/42 |

Primary Examiner—Evon C. Blunk
Assistant Examiner—W. Scott Carson
Attorney, Agent, or Firm—Thomas L. Tully

[57] ABSTRACT

A pneumatic materials handling and scaling system comprising a materials supply container, a materials receptor scale container and a pneumatic conveyor tube associated with both containers for conveying material from the supply container to the receptor container at uniform speed and for conveying excess material back to the supply container, characterized by the supply container being provided with adjustable feeder means for introducing the material from the supply container into the pneumatic tube at adjustable rates and the pneumatic tubing being provided with valve means operative between a diverted position in which it diverts substantially the complete flow of material from the pneumatic tube into the receptor container and a through position in which it permits substantially the complete flow of material through the pneumatic tube bypassing the receptor container and preferably a dribble position in which it partially diverts the flow of material from the pneumatic tube into the receptor container while the feeder means is operating at a reduced speed.

10 Claims, 6 Drawing Figures

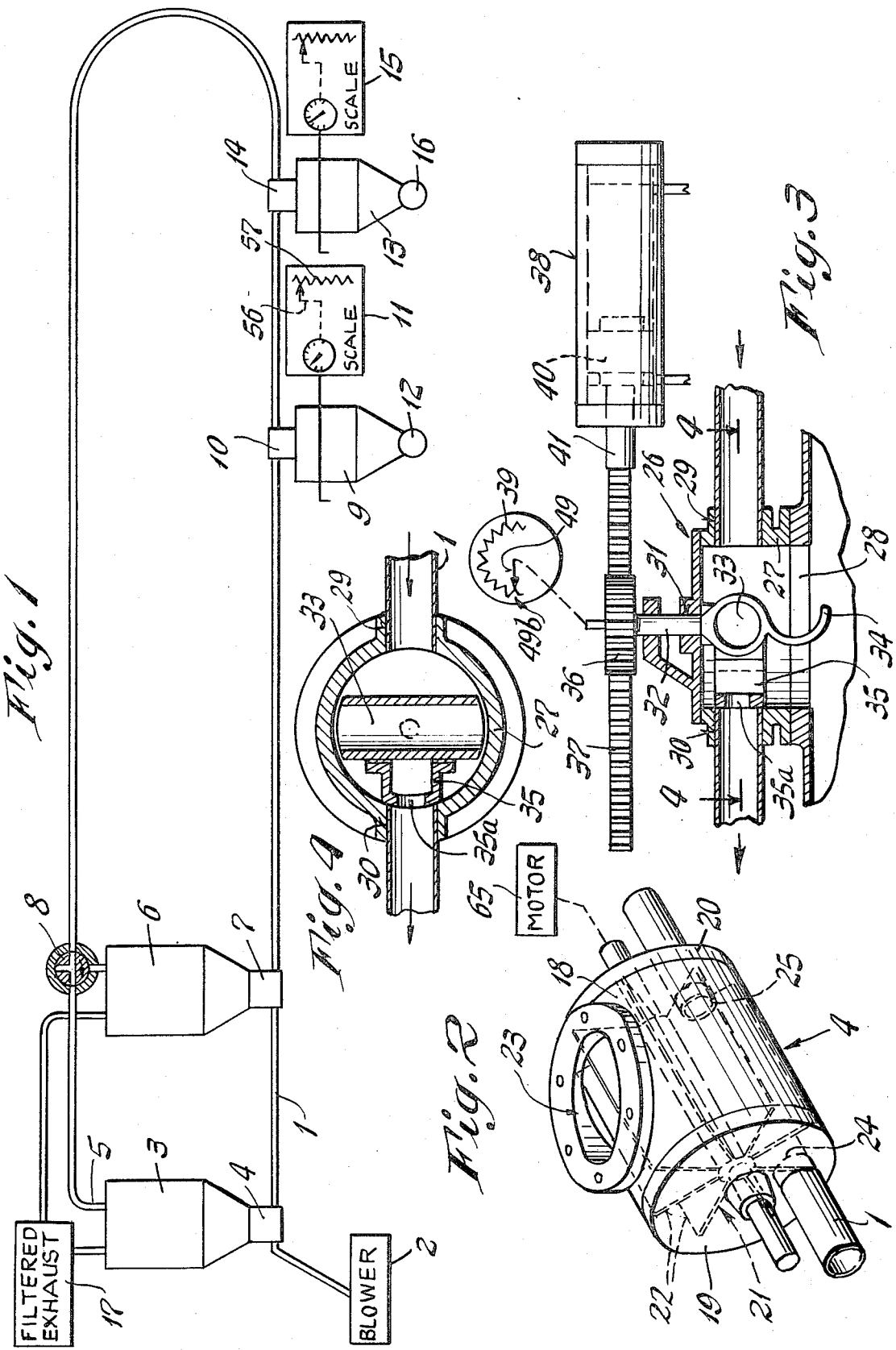

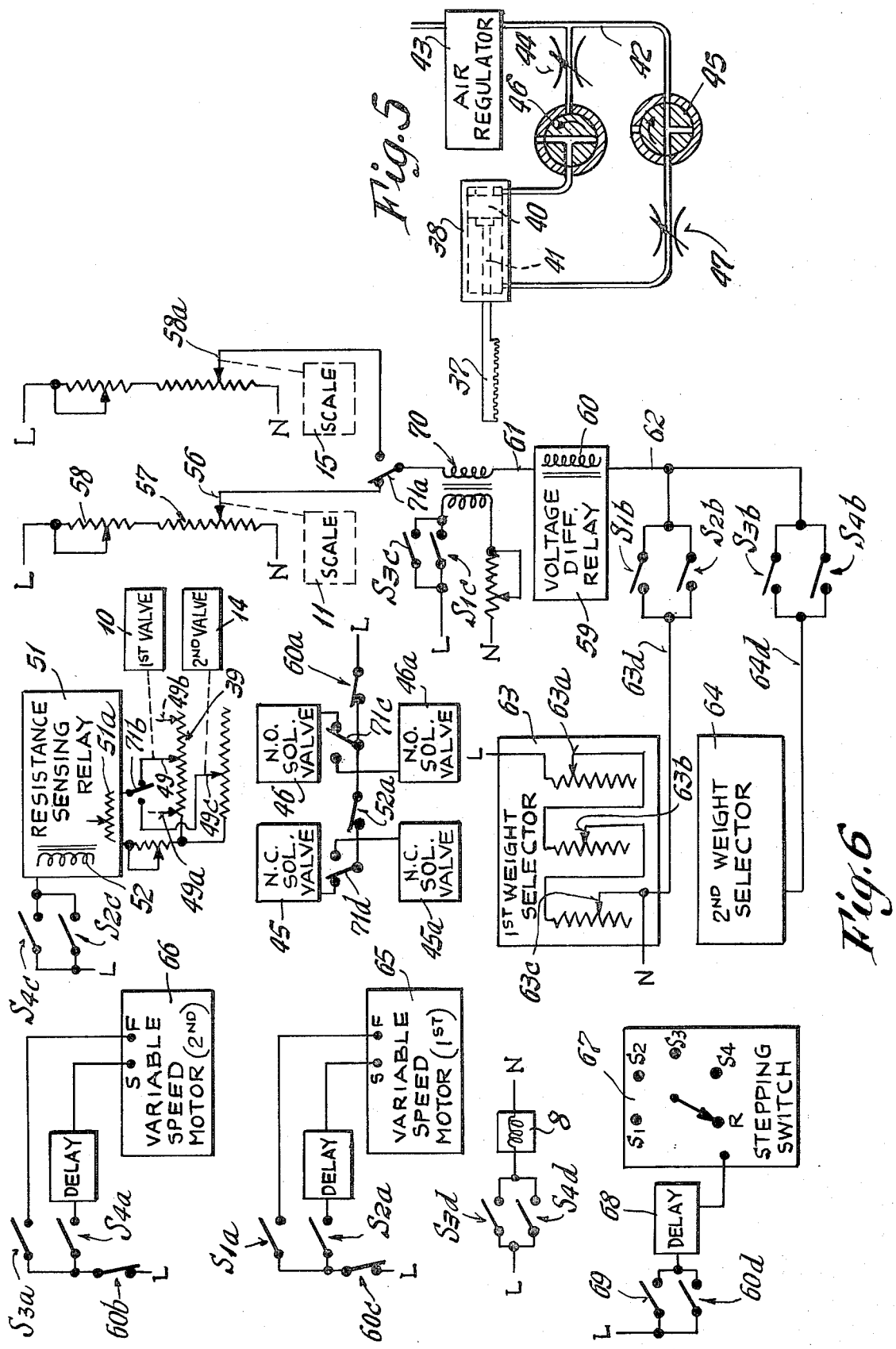

PNEUMATIC SCALING SYSTEM

The present invention relates to a pneumatic system for the automatic conveyance and scaling or weighing of predetermined ingredients such as different types of flour, starch and other free flowing particulate material capable of being conveyed in a pneumatic system, to produce a batch mixture containing the required ingredients in the required relative amounts within very close tolerances.

Pneumatic systems are well known for the automatic conveyance and scaling of predetermined ingredients to produce batch mixtures for use in conjunction with dough mixing machines, soup cooking kettles and the like. However such known systems have a number of disadvantages. The most common disadvantage is the inability of such systems to operate within the very close tolerances required by most manufacturers to insure the quality and consistency of their products. One known system, capable of operating within fairly close tolerances, employs a multiplicity of valves and extensive electrical controls. Such system is not only expensive and complicated but it is difficult to maintain in operation for prolonged periods because of the multiplicity of components involved, each of which is subject to failure. According to another known system, the ingredients to be scaled are pneumatically conveyed from bag dumps to use bins positioned in side-by-side relationship over a scale hopper. The individual ingredients are then fed directly into the scale hopper to produce a combination containing the required weight of each. The main disadvantage of this system, aside from lack of close tolerance, is the large amount of headroom required to locate the supply containers over the scale hopper, which requirement is generally met by locating the supply containers on a second floor level over the scale hopper located on the first floor level.

It has been proposed to overcome the headroom problem by separately locating the supply containers and the scale hopper and conveying the ingredients from the former to the latter by means of high speed air flow pneumatic tubing. However such proposed systems, to the best of my knowledge, are also incapable of conveying and scaling ingredients within the very close tolerances required by many food manufacturers. In many cases such manufacturers require a tolerance of ±0.25 percent by weight or less with respect to the weight of the different ingredients, such as different types of flour, starches, and the like, blended into their products. In such cases known pneumatic systems have not proven suitable.

It is the principal object of the present invention to provide an improved pneumatic system capable of automatically conveying and scaling solid ingredients such as different types of flour, starches, and the like, within extremely close tolerances of ±0.25 percent by weight or less.

It is another object of this invention to provide a pneumatic system of the aforementioned tolerance which is capable of conveying and scaling solid ingredients in a minimum amount of time.

These and other objects and advantages of the present invention will be apparent to those skilled in the art in the light of the present description including the drawings, in which:

FIG. 1 is a diagrammatic view of a simplified pneumatic system according to the invention.

FIG. 2 is a perspective view of a rotary feeder according to the invention.

FIG. 3 is a diagrammatic cross-section of a diverter valve according to one embodiment of the invention.

FIG. 4 is a sectional plan view taken on the line 4—4 of FIG. 3.

FIG. 5 is a schematic diagram of a pneumatic system for the operation of the diverter valve illustrated by FIG. 3.

FIG. 6 is an electrical schematic diagram of the electrical components of the present invention.

The pneumatic system of the present invention is designed for use as part of a total system for receiving materials such as different types of free flowing, particulate materials from a bag dump station or bulk bins, delivering these materials in sifted condition by pneumatic means to separate use bins or supply containers from which the different materials are automatically delivered by pneumatic means to scale hoppers or receptor containers which receive the required portions of each of the different materials from the different use bins to provide a combination of these materials in the required amounts for final delivery to a use station. The present invention relates to improved means for the delivery of the material from the use bins or supply containers and therefore, for purposes of simplification, the description and drawings are primarily concerned with such sub-system, the other features of the total system being conventional in the art as illustrated, for instance, by Weller U.S. Pat. No. 2,795,463 and other patents.

Referring to FIG. 1, an embodiment of the present system comprises a pneumatic tube 1 associated with a blower 2 for propelling air at high speed through the tube, a first materials supply container 3 of conventional type associated with an adjustable speed feeder 4 for introducing material from container 3 into the pneumatic tube 1 at the desired rate of speed, and an inlet 5 for receiving circulated material from the pneumatic tube, and a second materials supply container 6 of conventional type associated with an adjustable speed feeder 7 for introducing material from container 6 into the pneumatic tube 1 at the desired rate of speed, and a three-way solenoid valve 8 for receiving circulated material from the pneumatic tube. The supply system is such that only one of feeders 4 and 7 operates at a time. Three-way valve 8 is in the through position, as illustrated, while material from supply container 3 is being introduced into the tube 1 so as to permit the circulated excess material to return to container 3. Conversely valve 8 is in the diverted position while material from supply container 6 is being introduced into tube 1 so as to cause the circulated excess material to return to container 6.

The system of FIG. 1 also comprises a first receptor scale container 9 of conventional type associated with a diverter valve 10 for directing the flow of material from the tube 1, scale means 11 for determining the weight of material in container 9 and a rotary airlock or butterfly valve 12 for evacuating the material from container 9 to a use station. Also provided is a second receptor scale container 13 of conventional type associated with a diverter valve 14, scale means 15 and rotary airlock or butterfly valve 16 similar to the corresponding elements of container 9. This receptor system is such that the diverter valve 10 is in diverted position, i.e., closed to the tube 1 and open to the container 9, and the diverter valve 14 is in through position, i.e., open to the tube 1 and closed to the container 13, during the filling of container 9, and vice versa during the filling of container 13. As illustrated the supply containers 3 and 6 are vented to a dust-collecting conduit 17.

In operation, supply containers 3 and 6 are automatically filled from the bag dump stations or from bulk bins through a separate pneumatic tube system with the required materials, for instance wheat flour, in container 3 and P.T.T. flour in container 6. These materials are then to be automatically conveyed to the receptor containers or scale hoppers 9 and 13, one at a time, in the required relative weights and within very close tolerances.

The scale means 11 and 15 are preset in association with the feeders 4 and 7 and with the valves 8, 10 and 14 so that there is communication between only one supply container and only one receptor container or scale hopper at any given time and so that the required weight of each of the flours from supply containers 3 and 6 can be automatically fed, one at a time, to each of the receptor containers 9 and 13, one at a time, to fill the latter with the required mixture.

In operation, blower 2 is activated to establish a high speed air flow through the pneumatic tube 1 while valves 8, 10 and 14 are in through position and feeders 4 and 7 are not operating. Next diverter valve 10 is automatically moved to its diverter position for the supply of flour from container 3 to container 9, and feeder 4 is activated for high speed operation whereby the wheat flour, for instance, is fed at a high rate from container 3 into tube 1, conveyed, and diverted into receptor container 9 and weighed by scale 11. As the desired weight of wheat flour is approached, for instance after 130 pounds of a desired 150 pounds have been delivered, the scale means gives a signal which stops feeder 4 and returns diverter valve 10 to the through position, thus returning any flour present in tube 1 to supply container 3.

Next the feeder 4 resumes operation but at a reduced speed of only 5 percent to 50 percent, preferably from 10 percent to 30 percent of the original full speed, and the diverter valve 10 moves to diverted position to cause the wheat flour to be diverted into container 9 at a slower rate until the scale means senses that the required total weight of 150 pounds has been reached. At this point the feeder 4 is again stopped and the diverter valve 10 is again returned to through position and any residual wheat flour in the pneumatic tube 1 is returned to supply container 3.

As can be understood, the variation in the speed of the feeder 4 provides a control over the weight of flour per unit volume of air in the pneumatic tube. Thus, the bulk of flour is delivered in a minimum of time by introducing a large weight of flour per volume of air. Then, as the desired final weight is approached, the concentration of flour in the tube 1 is substantially reduced so that the weight of flour which enters the receptor container 9 after the required final weight has been reached, due to the fractional second time lapse required for the deactivation of the feeder 4 and the opening of the diverter valve 10, is minimal and within a tolerance of ±0.35 percent by weight or less.

According to a preferred embodiment which permits even greater scaling accuracy, each of the diverter valves 10 and 14 is adapted for automatic movement to a semi-open or dribble position during the final filling operation, while the respective feeder 4 or 7 is operating at reduced speed. This permits a further reduction in the weight of flour which can enter the receptor containers 9 or 13 as the final weight is being approached because a portion of the flour introduced at slow speed into the pneumatic tube 1 is not diverted into the receptor container 9 or 13 but is returned to the supply container 3 or 6 from which it originated. Thus the amount of flour which can enter the receptor container after the final weight has been reached is further reduced to provide exceptional accuracy within a tolerance of ±0.2 percent by weight or less.

Referring again to the operation of the system of FIG. 1, when receptor container 9 has received the required weight of wheat flour from supply container 3 and feeder 4 has stopped and diverter valve 10 has returned to the through position, as discussed, receptor container 9 is ready to be supplied with P.T.T. flour in the required amount from supply container 6. Thus, diverter valves 8 and 10 are activated to the diverted position and feeder 7 is activated for high speed operation to introduce the P.T.T. flour from container 6 into the pneumatic tube 1 for diversion into receptor container 9. As the required weight of P.T.T. flour is approached, the scale means 11 signals the feeder 7 to stop and the diverter valve 10 returns to the through position to permit residual P.T.T. flour in the tube 1 to return to supply container 6 through three-way solenoid valve 8.

Next the feeder 7 resumes operation, but at a reduced speed as discussed supra, and diverter valve 10 moves to either a diverted or dribble position, depending upon the system as discussed supra, to cause the P.T.T. flour to again enter the receptor container 9 but at a reduced concentration as the final desired weight of P.T.T. flour is approached on the scale. When the desired weight is reached, feeder 7 stops and valve 10 returns to the through position and any residual P.T.T. flour in tube 1 returns to supply container 6. At this point the receptor container 9 has been supplied with a combination of wheat flour and P.T.T. flour in the required weight within a tolerance of ±0.35 percent by weight or less.

Next the cycle is repeated whereby receptor container 13 is filled with the same required mixture of wheat flour and P.T.T. flour from supply containers 3 and 6 while diverter valve 10 of receptor container 9 remains in the through position, sealing the container from the pneumatic tube 1. If desired, the filled receptor container 9 may be activated to discharge its contents into the rotary airlock or butterfly valve 12 for delivery to a use station while the receptor container 13 is being filled, and vice versa.

The simplified system illustrated by FIG. 1 provides for the automatic scaling of two different materials into two separate containers or scale hoppers. Obviously three or more supply containers may be included for the incorporation of three or more different materials, and additional receptor containers or scale hoppers may also be present in the system, if desired.

An essential element of the present system is the variable speed rotary feeder. FIG. 2 of the drawings illustrates the rotary feeder 4 of FIG. 1 in greater detail. Thus the feeder 4 comprises a housing cylinder 18, end plates 19 and 20 and a rotary paddle wheel 21 carrying a number of paddles 22. The housing 18 has a top opening 23 which communicates with the supply container to receive material therefrom, and the end plates 19 and 20 have openings 24 and 25 which communicate with the pneumatic tube 1 to permit material within the housing in the area of the openings 24 and 25 to be caught in the air flow and blown out of the feeder. The paddles 22 engage the inner surface of the housing cylinder 18 and the inner surfaces of the end plates 19 and 20 so that only that material conveyed to the bottom of the feeder by the rotary paddle wheel comes under the influence of the air flow in pneumatic tube 1.

According to this invention, the rotary paddle wheel is activated by means of a variable speed motor, or a single speed motor having a variable drive, or a two-speed motor, to operate the paddle wheel at a high speed in the area of 25–30 rpm and at a low speed of from 5 percent to 50 percent of high speed. At high speed the paddle wheel conveys large amounts of material from the supply container to the influence of the air flow per unit time whereas the amount of material conveyed at slower speeds is reduced proportionately to the reduction in speed. When the feeder is deactivated, the paddle wheel stops and only that amount of material at the bottom of the housing remains under the influence of the air flow and is conveyed into tubing 1. I have found that the amount of material which is released into the pneumatic tubing is proportionate to the speed of the rotary paddle wheel, and that such amount can be reduced by from 50 to 95 percent by weight by reducing the speed of the rotary feeder to from 5 to 50 percent of full speed during the final scaling operation.

FIG. 3 of the drawings illustrates a preferred embodiment of this invention, wherein the diverter valves 10 and 14 are capable of activation to a semi-open or dribble position. The diverter valve 26 of FIG. 3 comprises a cylindrical housing 27 having a bottom opening 28 communicating with a receptor container or scale hopper, side openings 29 and 30 communicating with the pneumatic tube 1 and a top opening 31 provided with bearing means supporting a rotary valve element 32. The valve element 32 comprises a hollow passage 33, a deflecting vane 34, a through baffle 35 having a central air pass opening 35a, and a gear 36 which engages a rack 37 for rotation of the valve element within the housing 27 between diverted position, as illustrated, in which all material entering opening 29 is deflected into the scale hopper, and through and dribble positions. The rack and gear arrangement is a conventional arrangement in which the rack 37 is associated with a pneumatic cylinder 38 which can be energized to extend or withdraw the rack 37 to rotate the valve element and cause it to assume the desired position.

As shown by FIG. 3, the valve element is associated with a variable resistance element 39 which has its shaft rotated by the valve element 32, thereby varying the resistance of the element. The amount of resistance of the element at diverted position, as illustrated in FIG. 3, and through position and dribble position is predetermined and is used to stop the rotation of the valve element when it reaches any of these positions.

The movement of the diverter valve element is controlled by an air cylinder system, as illustrated by FIG. 5. The system comprises cylinder 38 and piston 40 having a rod 41 supporting rack 37. Movement of the piston within the cylinder causes the rack to travel and to rotate the diverter valve element by means of the gear 36 thereon. The pneumatic system comprises a pneumatic tube 42, an air regulator 43 thereon and, connected to an air pressure supply, a pressure regulator 44 and three-way normally opened solenoid valve 46 on the portion of the tube 42 connected to the piston end of cylinder 38, and a three-way normally closed solenoid valve 45 and a speed control valve 47 on the portion of the tube 42 connected to the rod end of cylinder 38. Valves 45 and 46 are provided with air exhaust outlets.

FIG. 3 illustrates the piston 40 positioned for the diverter valve in diverted position. Thus solenoid valves 45 and 46 are both energized, valve 45, when energized, cutting off air pressure to the rod end of the cylinder and valve 46, when energized, directing a constant air pressure to the piston end of the cylinder whereby the rod 41 and rack 37 are extended to the desired extent.

When solenoid valves 45 and 46 are both deenergized, the position shown in FIG. 5, the air pressure is directed only to the rod end of cylinder 38 causing rod 41 and rack 37 to be retracted to the desired extent. At this point, the diverter valve is in the through position.

The third or dribble position of the diverter valve is reached by first energizing both solenoid valves to direct constant air pressure to the piston end of the cylinder to cause the piston, rod and rack to be extended until the valve 10 is in its dribble position when valve 45 is deenergized to direct the constant air pressure to the rod end of the cylinder. The piston thus has air pressure on both sides and stops its travel at the desired intermediate position whereby the diverter valve is in the desired semi-open, dribble position.

Referring to FIG. 6, there is shown an electrical schematic diagram of the electrical components of the present invention. The diverter valve 10 has its shaft connected to a tap 49 of the variable resistance element 39 which is connected to a resistance balance sensing relay 51 having a normally unenergized relay coil 52 that becomes energized upon the setting of the tap 49 corresponding with the setting of an adjustable resistor 51a therein. Also shown are the normally closed solenoid valve 45, the normally open solenoid valve 46 and the scale means 11 of hopper 9 having its shaft connected to a tap 56 of a potentiometer 57 that is connected in series with a calibrating resistance 58 across the line which may be 115 volts and the terminals of which are denoted L and N. The tap 56 is connected to a voltage differential relay 59 having a relay coil 60 with the coil 60 being energized only when the voltage on a lead 61 equals the voltage on a lead 62.

The lead 62 derives its voltage from either a first weight selector 63 or an identical second weight selector 64. Each of the weight selectors permits manual selection of a three digit number with the selection being determined by the positioning of three taps 63a, 63b and 63c for selector 63 on their respective resistances, with the tap 63a providing a voltage having a value that represents the value of the units digit in the selected weight, the tap 63b selecting a voltage value representative of the tens digit of the selected weight and the tap 63c providing a voltage value representative of the hundreds digit of the desired weight. Thus, by positioning the taps 63a, 63b and 63c on their respective resistances, a voltage representative of the selected three digit weight for a first material will occur on an output lead 63d. For the second material, the voltage representing the selection will occur on the lead 64d. The setting of the selectors 63 and 64 is for the weight measured by the scale hopper 9 and hence the second selector weight setting will be the weight of the first material plus the desired weight of the second material.

A first variable speed motor 65 for feeding quantities of the first material from supply container 3 has two terminals S and F with energization of the terminal S producing a slow speed in feeder 4 while energization of the terminal F produces a fast speed of the motor and thus a fast speed in feeder 4. Without energization at either of these terminals, the motor stops. Similarly, a second motor 66 is provided which is adapted to control the feeding of the second material from supply container 6 by means of feeder 7.

There is also provided a stepping switch 67 having, as shown, five positions S1 through S4 and a reset position R with the input pulses for actuating the stepping switch to advance one step being obtained through a delay 68 of perhaps 15 seconds. Upon the delay 68 being energized, it maintains the stepping switch at its same position for perhaps 15 seconds before producing a pulse to the switch to advance it to its next position. The delay will only produce one pulse each time it is changed from being deenergized to being energized irrespective of the duration of its energization.

The switch position S1 controls a plurality of switches, namely S1a, S1b and S1c; the switch position S2 controls switches S2a, S2b and S2c; switch position S3 controls switches S3a, S3b, S3c and S3d; while the switch position S4 controls switches S4a, S4b, S4c and S4d. Each of these switches is open except when the stepping switch 67 is at its corresponding switch position. The reset position R is internally connected so that when the switch is located at this position, the next input pulse will cause the switch to assume the S1 position.

The relay coil 60 has relay switches 60a, 60b, 60c and 60d, while the relay coil 52 in resistance sensing relay 51 operates switch 52a. Each of the relay switches are shown in the drawing as they would be with their respective relay coils deenergized.

With the circuit as shown and without power applied thereto, the solenoid valves 45 and 46 will cause the diverter valve 10 to assume its bypass position which locates the tap 49 at the position indicated by the arrow 49a, whereby material will be bypassed by the valve 10. The circuit is initially energized after the weights have been selected by the closing (either manually or automatically) of a start button 69. This energizes the delay 68 to advance the stepping switch to its position S1, but during the delay the valve 46 becomes energized by switch 60a being closed and also the valve 45 is energized to be open by switches 60a and 52a being closed, which causes the diverter valve 10 to assume its filling position to pass the first material into the scale hopper 9 and position the tap 49 at the dotted line location 49b.

Upon completion of the delay, the stepping switch 67 is advanced to the S1 position which closes the S1 switches to energize the first motor 65 at a fast speed through switch S1a; to place the voltage of the first weight selector on the lead 62 through switch S1b; and to introduce into the lead 61 by way of a transformer 70 through switch S1c a voltage which is added to the voltage produced by the tap 56. This adding voltage is equivalent to the voltage produced by a weight of perhaps 10 pounds on the scale means 11 so that the voltage in the lead 61 is thus representative of a weight 10 pounds higher than the actual scale reading. Material fed by the motor 65 is thus being diverted into the scale hopper 9 so that the scale will increase its weight and move the tap 56 downwardly until the voltage on the lead 61 equals the voltage on the lead 62. The scale means 11 now reads 10 pounds less than the weight selected by the selector 63.

Relay 60 now becomes energized, which opens switch 60a to cause the diverter valve 10 to assume the position 49a as it deenergizes the solenoid valves 45 and 46 and also switch 60c opens to deenergize the motor 65. In addition, switch 60d closes to energize the delay 68. The circuit will remain until the delay 68 has caused the stepping switch 67 to assume position S2 and during this delay, material is not being introduced and the diverter valve 10 is in its bypass position so that the system will, in effect, purge itself of the material in the line.

Upon the stepping switch advancing to the S2 position, lead 61 assumes a voltage representative of the scale weight by reason of the elimination of the transformer voltage 70 by switch S1c opening, and the relay 60 then becomes deenergized. Energization of the valves 45 and 46 moves diverter valve 10 towards its diverted or filling position until the tap 49 produces a resistance equal to that produced by the selection potentiometer 51a of the relay 51 which then energizes the relay 51 from the line through closed switch S2c. Switch 52a opens to deenergize valve 45 and cause the diverter valve 10 to be held at the solid line or dribble position shown of the tap 49 as air is introduced on both sides of the piston 40. In addition, the switches S2a and 60c both are closed to energize the motor 65 and rotary feeder 4 at a slow speed after a 15 second delay which is employed to enable the valve 10 to assuredly assume the dribble position. The motor is now operated at perhaps 20 percent of the fast speed material feed rate.

The valve 10 by being in its dribble position and the slow feed of material by feeder 9 will cause the scale to increase its weight slowly until the voltage on the lead 61 equals the voltage on the lead 62, at which time the relay 60 then becomes energized, causing stoppage of motor 65 and feeder 4 (by switch 60c opening) and movement of valve 10 to its bypass position 49a (by switch 60a opening). The valve 10 will attain the bypass position during the delay introduced by the delay 68 after closure of switch 60d which also provides time to purge the system of the first material. After expiration thereof, the stepping switch 67 will assume the position S3, at which time lead 62 becomes connected to the second weight selector lead 64d through switch S3b and the transformer 70 introduces the 10 pound additional voltage on the lead 61 by switch S3c to deenergize relay coil 60. The diverter valve 10 then is moved to its filling position 49b by energization of solenoid valves 45 and 46, switch 52a now being closed as switch S2c deenergizes relay coil 52. Switch S3a closes to cause motor 66 to begin feeding the second material from second supply container 6 by means of rotary feeder 7 at a fast rate to the valve 10. The second material continues to be fed with the diverter valve 10 filling the scale hopper 9 until its weight, as represented by a voltage on the lead 61, is 10 pounds less than that selected by the weight selector 64. The relay 60 becomes energized, enabling the valves 45 and 46 to move the diverter valve 10 to the bypass position 49a and also stop the motor 66 and rotary feeder 7 from feeding material. The system, as with the first material, will purge itself during the time of delay 68, and afterwards will assume its dribble position during the delay caused by switch S4a closing. The second material will be slowly fed to the hopper 9 until the scale weight equals the setting of the second weight selector 64, at which time the system stops further material feeding and purges itself to be ready for the next weighing of the two materials.

If desired, a third material may be weighed by adding another weight selector, variable speed motor and two additional positions to the stepping switch, together with its associated switches, as will be understood by those skilled in the art.

To assure during the purge time that the material is directed back to its own supply container, the three-way solenoid valve 8 of supply container 6 is maintained denergized during the feeding of material from container 3 to bypass the material past the container 6, as illustrated by FIG. 1. However when material is being supplied from the container 6, the switches S3d and S4d energize the three-way valve 8 to direct the purging material back to its container 6.

In order to enable the electrical system to control the filling of material into the second scale hopper 13, at the same weights as the first scale hopper 9, the system further includes the scale means 15 connected to a tap 58a to provide a voltage representative of its weight; the second diverter valve 14 is connected to a tap 49c; and solenoid valves 45a and 46a are interconnected with the valve 14 to operate it in the same manner as the valves 45 and 46 operate the valve 10. A two position, four pole switch having poles 71a–71d shifts the control between the two scales by means of the pole 71a that places the voltage of tap 58a on the lead 61, the pole 71b that connects the tap 49c to the resistance sensing relay 51, the pole 71c that connects the valve 46a in place of the valve 46 to the source of energy, and the pole 71d that connects the valve 45a in place of the valve 45 to the source of energy. Thus, when filling the second container, the scale means 15 will control operation of the diverter valve 14 of the second hopper 13. The diverter valve 10 of the first hopper 9 will be placed in its bypass position as its solenoid valves 45 and 46 are deenergized. This switch may be manually or automatically operated, if desired, as for example in the latter instance using the R position of the stepping switch to cause it to shift its position each time the stepping switch assumes its R position.

Variations and modifications may be made within the scope of the claims and portions of the improvements may be used without others.

I claim:

1. A pneumatic conveying system for conveying finely divided material from a supply container to a receptor container by means of a conduit and for returning a portion of said finely divided material to said supply container, comprising a conduit, blower means for moving a stream of a gas at relatively high speed through said conduit, a supply container, feeder means adapted to mechanically feed finely divided material from said supply container into said conduit, a receptor container spaced from said supply container by means of said conduit, scale means associated with said receptor container and adapted to sense when a predetermined first weight and a predetermined final weight of finely divided material has been deposited in said receptor container, valve means associated with said conduit and with said receptor container and adapted for movement from a first position in which it seals said receptor container from said conduit to permit the return of said material to said supply container by said conduit and a second position in which it diverts the flow of said finely divided material from said conduit into said receptor container, and a third position in which it diverts only a portion of the flow of finely divided material from said conduit into said receptor container while permitting the other portion of said material to be returned to the supply container by means of the conduit, and means associated with said scale means and with said feeder means for operating said feeder means at a relatively high speed while said valve is in said second position until said predetermined first weight has been deposited in said receptor container and at a relatively lower speed while said valve is in said third position until said predetermined final weight has been deposited in said receptor container to vary the rate at which said finely divided material is fed into said conduit for conveyance to said receptor container.

2. A system according to claim 1 in which there are a plurality of supply containers each having its own feeder means adapted to mechanically feed finely divided material into said conduit, means for operating said feeder means one at a time, and means for returning the portion of said finely divided material which is not diverted into said receptor container to the particular supply container from which it originated.

3. A system according to claim 1 in which there are a plurality of receptor containers each having its own valve means, and means for controlling said valve means whereby only one of said valve means is adapted for movement to said second position at any given time and whereby the others of said valve means remain in said first position.

4. A system according to claim 1 in which there are a plurality of supply containers, each having its own feeder means, and a plurality of receptor containers, each having its own valve means, means for selectively conveying finely divided material from each of said supply containers, one at a time, to each of said receptor containers, one at a time, and for returning the material from each of the supply containers, which is not diverted into a receptor container, back to the supply container from which it originated.

5. A system according to claim 1 which comprises means for providing a signal indicative of the position of the diverter valve, and adjustable means for establishing a value of said signal for said third position.

6. A pneumatic conveying system for conveying finely divided material from a plurality of supply containers to a plurality of receptor containers by means of a conduit and for returning a portion of said finely divided material to the supply container from which it originated, comprising a conduit, blower means for moving a stream of a gas at relatively high speed through said conduit, a plurality of supply containers, feeder means associated with each of said supply containers and adapted to mechanically feed finely divided material from each supply container into said conduit, a plurality of receptor containers spaced from said supply containers by means of said conduit, valve means associated with said conduit and with each of said receptor containers and adapted for movement from a first position in which it seals the receptor container from said conduit to permit the return of said material to the supply container from which it originated by said conduit, a second position in which it diverts the flow of said finely divided material from said conduit into the receptor container and a third position in which it diverts only a portion of the flow of said finely divided material from said conduit into the receptor container, means for operating said feeder means at relatively high speed when said valve means is in said second position and at relatively lower speed when said valve means is in said third position.

7. A pneumatic conveying system according to claim 6 comprising scale means associated with each of said receptor containers and adapted to sense when a predetermined first weight and a predetermined final weight of finely divided material has been deposited in each receptor container from each of said supply containers, and means associated with each said scale means and with each feeder means for operating said feeder means at relatively high speed until said first weight is deposited and then at relatively lower speed until said final weight is deposited.

8. A method for conveying a predetermined desired weight of a finely divided material from a supply container to a receptor container by means of a pneumatic conduit comprising introducing said material into the gas flow in said conduit at a relatively high rate, diverting said gas flow into a receptor container until an amount of said material short of the desired weight has been deposited, ceasing the diversion of said material into the receptor container and ceasing the introduction of said material into the conduit whereby the conduit is purged of material therein, reintroducing said material into the gas flow in the conduit but at a relatively lower rate, and diverting only a portion of the gas flow into the receptor container until said predetermined desired weight of finely divided material has been deposited in said receptor container.

9. A pneumatic conveying system for conveying finely divided material from a supply container to a receptor container by means of a conduit and for returning a portion of said finely divided material to said supply container, comprising a conduit, blower means for moving a stream of a gas at relatively high speed through said conduit, a supply container, feeder means adapted to mechanically feed finely divided material from said supply container into said conduit, a receptor container spaced from said supply container by means of said conduit, scale means associated with said receptor container and adapted to sense when a predetermined first weight and a predetermined final weight of finely divided material has been deposited in said receptor container, valve means associated with said conduit and with said receptor container and adapted for movement from a first position in which it seals said receptor container from said conduit to permit the return of said material to said supply container by said conduit and a second position in which it diverts the flow of said finely divided material from said conduit into said receptor container, means associated with said scale means and with said valve means for movement of said valve means from said second position to said first position to purge the conduit of said material when said first predetermined weight has been deposited, from said first position to said second position until said final predetermined weight has been deposited, and from said second position to said first position to again purge the conduit of said material, and means associated with said scale means and with said feeder means for stopping said feeder means when said predetermined first weight has been deposited and for operating the feeder means at reduced speed until said predetermined final weight of material has been deposited and for stopping the feeder means when said predetermined final weight has been deposited.

10. A pneumatic conveying system for conveying finely divided material from a supply container to a receptor container by means of a conduit and for returning a portion of said finely divided material to said supply container, comprising a conduit, blower means for moving a stream of a gas at relatively high speed through said conduit, a supply container, feeder means adapted to mechanically feed finely divided material from said supply container into said conduit, a receptor container spaced from said supply container by means of said conduit, scale means associated with said receptor container and adapted to sense when a predetermined first weight and a predetermined final weight of finely divided material has been deposited in said receptor container, valve means associated with said conduit and with said receptor container and adapted for movement from a first position in which it seals said receptor container from said conduit to permit the return of said material to said supply container by said conduit and a second position in which it diverts the flow of said finely divided material from said conduit into said receptor container, and a third position in which it diverts only a portion of the flow of said finely divided material from said conduit into said receptor container while permitting the other portion of said material to be returned to the supply container by means of the conduit, means associated with said scale means and with said valve means for movement of said valve means from said second position to said first position to purge the conduit of said material when said first predetermined weight has been deposited, from said first position to said second position until said final predetermined weight has been deposited, and from said second position to said first position to again purge the conduit of said material, and means associated with said scale means and with said feeder means for operating said feeder means at relatively high speed until said predetermined first weight has been deposited and for operating the feeder means at relatively lower speed until said predetermined final weight of material has been deposited.

* * * * *